United States Patent
Shibata et al.

(10) Patent No.: US 10,531,021 B2
(45) Date of Patent: Jan. 7, 2020

(54) IMAGE GENERATING APPARATUS, IMAGE GENERATING METHOD, AND RECORDING MEDIUM FOR CONTROLLING IMAGE SENSOR HAVING TWO TYPES OF CELLS

(71) Applicant: PANASONIC INTELLECTUAL PROPERTY MANAGEMENT CO., LTD., Osaka (JP)

(72) Inventors: Osamu Shibata, Kanagawa (JP); Hiroshi Iwai, Osaka (JP); Kazuko Nishimura, Kyoto (JP); Yasuo Miyake, Osaka (JP); Yoshiaki Satou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/926,435

(22) Filed: Mar. 20, 2018

(65) Prior Publication Data
US 2018/0278862 A1 Sep. 27, 2018

(30) Foreign Application Priority Data
Mar. 22, 2017 (JP) ................. 2017-056567

(51) Int. Cl.
*H04N 5/353* (2011.01)
*G06K 9/00* (2006.01)
(Continued)

(52) U.S. Cl.
CPC ......... *H04N 5/353* (2013.01); *G06K 9/00805* (2013.01); *G06K 9/00825* (2013.01);
(Continued)

(58) Field of Classification Search
CPC . G06T 2207/10141; G06T 2207/10144; G06T 7/20; H04N 5/351; H04N 5/353;
(Continued)

(56) References Cited

U.S. PATENT DOCUMENTS 9,288,399 B2 * 3/2016 Takeuchi ............. H04N 5/3535
9,294,695 B2 * 3/2016 Kageyama ............ G06T 11/001
(Continued)

FOREIGN PATENT DOCUMENTS

JP 2014-023067 2/2014

OTHER PUBLICATIONS

U.S. Appl. No. 15/926,398 to Osamu Shibata et al., which was filed on Mar. 20, 2018.

*Primary Examiner* — Ngoc Yen T Vu
(74) *Attorney, Agent, or Firm* — Greenblum & Bernstein, P.L.C.

(57) ABSTRACT

An object is to extract the motion tracks of other vehicles from an image taken from a target vehicle. An image generating apparatus includes: a determiner circuit that determines whether surroundings of the target vehicle are in a dark place; and a control circuit that causes an image sensor including a high-sensitivity cell and a highly-saturated cell to create a highly-saturated frame by multiple exposures through the highly-saturated cell, the highly-saturated cell having lower sensitivity and larger charge storage capacity than the high-sensitivity cell, when the determiner circuit determines that the surroundings of the target vehicle are in the dark place.

12 Claims, 5 Drawing Sheets

(51) Int. Cl.
*G06T 7/20* (2017.01)
*H04N 5/355* (2011.01)

(52) U.S. Cl.
CPC .......... *G06T 7/20* (2013.01); *H04N 5/35563* (2013.01); *G06T 2207/10144* (2013.01)

(58) Field of Classification Search
CPC ............. H04N 5/3535; H04N 5/35563; H04N 5/35554; G06K 9/00805; G06K 9/00825
See application file for complete search history.

(56) References Cited

U.S. PATENT DOCUMENTS

| | | | |
|---|---|---|---|
| 9,531,958 B2* | 12/2016 | Kasai | H04N 5/2353 |
| 2018/0359401 A1* | 12/2018 | Oyaizu | G02B 5/30 |
| 2019/0020833 A1* | 1/2019 | Nishihara | G01J 1/44 |

\* cited by examiner

IMAGE GENERATING APPARATUS, IMAGE GENERATING METHOD, AND RECORDING MEDIUM FOR CONTROLLING IMAGE SENSOR HAVING TWO TYPES OF CELLS

CROSS REFERENCE TO RELATED APPLICATIONS

The disclosure of Japanese Patent Application No. 2017-056567 filed on Mar. 22, 2017 including the specification, drawings and abstract is incorporated herein by reference in its entirety.

TECHNICAL FIELD

The present disclosure relates to an image generating apparatus, an image generating method, a program, and a recording medium having the program stored thereon.

BACKGROUND ART

A technique is known in which a moving object is serially imaged by multiple exposures in such a manner that the same object in different positions is captured in a single image to express the motion of the object (for example, PTL 1).

CITATION LIST

Patent Literature

PTL 1
Japanese Patent Application Laid-Open No. 2014-23067

SUMMARY OF INVENTION

Technical Problem

However, a single image taken in a serial manner by multiple exposures in a running vehicle from which the single image is taken (hereinafter, target vehicle) contains other various objects in traffic environments, which makes it difficult to extract the motion track of another vehicle from that image.

For this reason, an object of the present disclosure is to provide an image generating apparatus, an image generating method, a program, and a recording medium having the program stored thereon, which allow the motion track of the other vehicle to be easily extract from the image.

Solution to Problem

An image generating apparatus according to one embodiment of the present disclosure includes: a determiner circuit that determines whether surroundings of a target vehicle are in a dark place; and a control circuit that causes an image sensor including a high-sensitivity cell and a highly-saturated cell to create a highly-saturated frame by multiple exposures through the highly-saturated cell, the highly-saturated cell having lower sensitivity and larger charge storage capacity than the high-sensitivity cell, when the determiner circuit determines that the surroundings of the target vehicle are in the dark place.

The aforementioned embodiment can be any one of a method, a program, and a non-transitory tangible recording medium storing a program.

Advantageous Effects of Invention

The present disclosure allows the motion track of a particular object to be extracted even if surroundings of the target vehicle are in a dark place.

DESCRIPTION OF EMBODIMENTS

Figure 1:
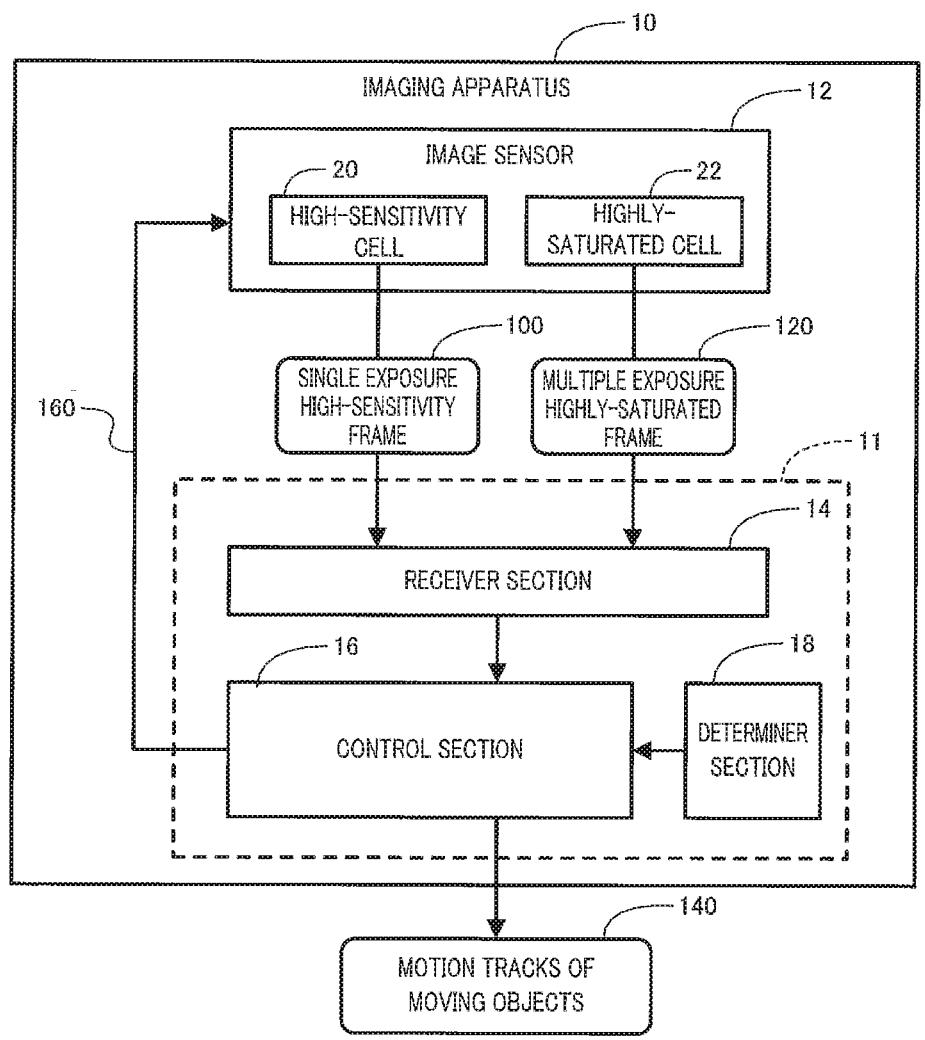
FIG. 1 is a block diagram of an imaging apparatus including an image generating apparatus according to Embodiment 1.

An embodiment will now be described with reference to accompanying drawings.

It should be noted that when elements of the same type are distinguished from each other for description, reference numerals, such as "light 230A" and "light 230B", may be used, and when elements of the same type are not distinguished from each other for description, only a common number in the reference numeral, such as "light 230", may be used.

In addition, in the embodiments below, the constituent elements (including constituent steps) are not necessarily essential unless otherwise clearly stated or clearly regarded as being theoretically essential.

Embodiment 1

Figure 2:
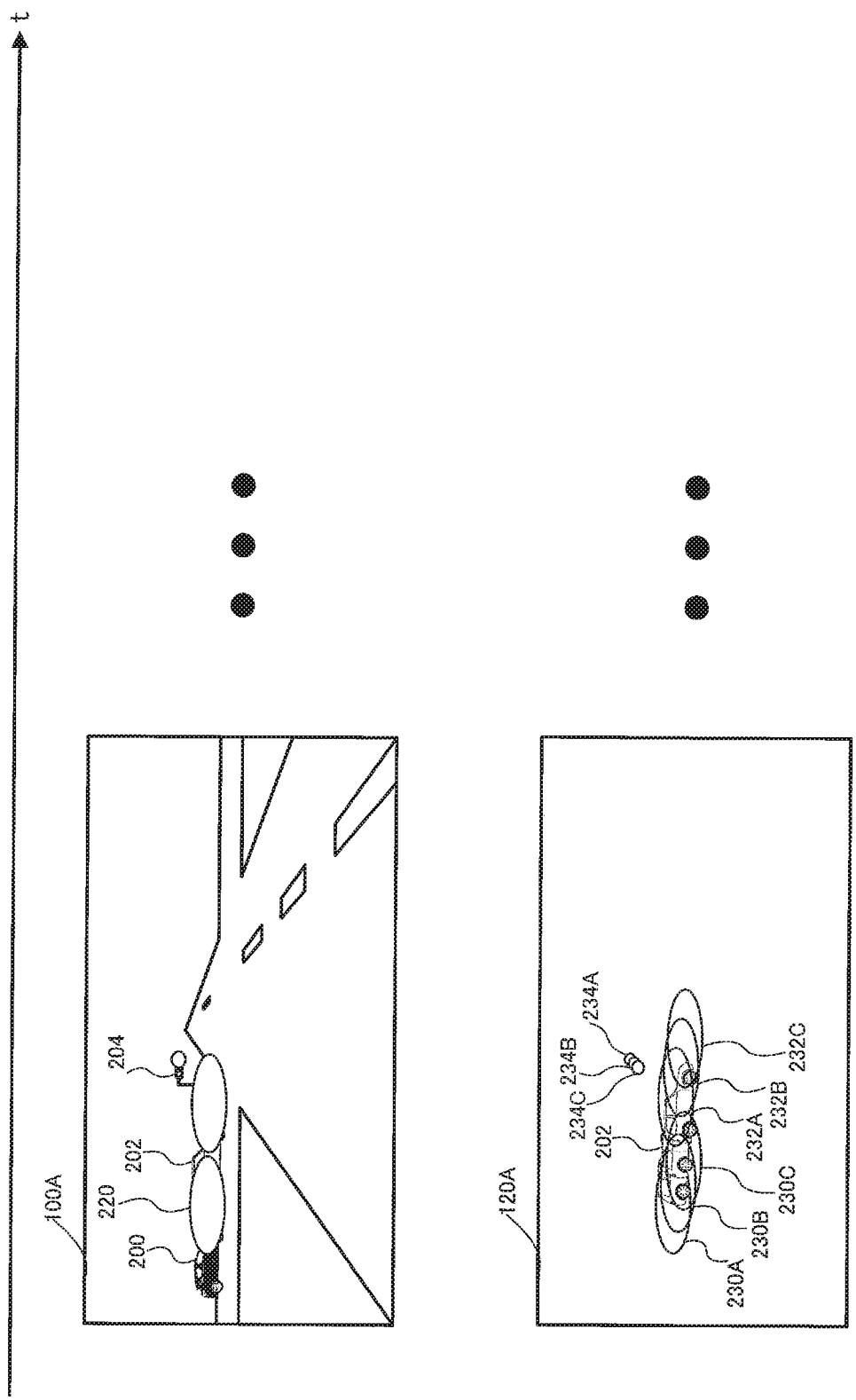
FIG. 2 is a diagram showing image frames output from an image sensor in Embodiment 1.

FIG. 1 is a block diagram of an imaging apparatus including an image generating apparatus according to Embodiment 1. FIG. 2 is a diagram showing image frames output from an image sensor in Embodiment 1.

Imaging apparatus 10 includes image sensor 12, receiver section 14, control section 16, and determiner section 18. It should be noted that functions related to receiver section 14, control section 16, and determiner section 18 may be implemented by image generating apparatus 11 which is, for example, a microprocessor or digital-signal processor. Alternatively, the functions may be implemented by a program executed on a computer including at least a memory and a processor, or when the computer reads the recording medium having the program stored thereon.

Image sensor 12 includes multiple pixels (a pixel array) including photoelectric conversion elements, and image frames are generated from signals obtained by photoelectric conversion of light incident on each pixel and then output to receiver section 14.

Image sensor 12 is a complementary metal oxide semiconductor (CMOS) image sensor made using, for example, an organic thin film. It should be noted that image sensor 12 is not limited to this and may be another CMOS image sensor or a charge coupled device (CCD) image sensor.

Image sensor 12 has the global shutter function. With the global shutter function, the start time and end time of exposure are common to all the pixels in the pixel array. The global shutter function allows a relatively fast-moving object to be imaged without distortion.

Image sensor 12 includes high-sensitivity cell 20 and highly-saturated cell 22 in each pixel.

High-sensitivity cell 20 has relatively high sensitivity and relatively small charge storage capacity. Accordingly, high-sensitivity cell 20 achieves imaging of, for example, traffic signs, traffic signals, pedestrians, or other vehicles even in dark places, e.g., at nighttime and in a tunnel. Image frame created by high-sensitivity cell 20 is referred to as "high-sensitivity frame".

On the contrary, highly-saturated cell 22 has lower sensitivity than high-sensitivity cell 20 and larger charge storage capacity. Accordingly, highly-saturated cell 22 can only image light emitted mainly by objects in dark places, such as light from headlights or taillights of other vehicles, traffic signals, and street lights. An image frame created by highly-saturated cell 22 is referred to as "highly-saturated frame".

High-sensitivity cell 20 creates a high-sensitivity frame by a single exposure. An image frame created by a single exposure is an image frame created by performing exposure once, i.e., by releasing the global shutter once. A high-sensitivity frame created by a single exposure in high-sensitivity cell 20 is referred to as "single exposure high-sensitivity frame 100".

It should be noted that high-sensitivity cell 20 can create a high-sensitivity frame also by multiple exposures. An image frame created by multiple exposures is an image frame created by performing exposure more than once, i.e., by releasing the global shutter more than once. A high-sensitivity frame created by multiple exposures in high-sensitivity cell 20 may be referred to as "multiple exposure high-sensitivity frame".

Highly-saturated cell 22 creates a highly-saturated frame by multiple exposures. A highly-saturated frame created by multiple exposures in highly-saturated cell 22 is referred to as "multiple exposure highly-saturated frame 120". It should be noted that highly-saturated cell 22 can create a highly-saturated frame also by a single exposure. A highly-saturated frame created by a single exposure in highly-saturated cell 22 may be referred to as "single exposure highly-saturated frame".

Single exposure high-sensitivity frame 100A shown in FIG. 2 is an example frame created by a single exposure in high-sensitivity cell 20 at nighttime. Single exposure high-sensitivity frame 100A contains another vehicle 200 moving from left to right in the drawing, another vehicle 202 moving in the same way, and traffic signal 204.

Multiple exposure highly-saturated frame 120A shown in FIG. 2 is an example frame created by multiple exposures: three exposures in the highly-saturated cell 22 at nighttime. In multiple exposure highly-saturated frame 120A, headlights 230A, 230B, and 230C of the other vehicle 200 moving from left to right in the drawing deviate from each other little by little, resulting in multiple imaging. The same applies to headlights 232A, 232B, and 232C of the other vehicle 202 moving in the same way. This is because the other vehicles 200 and 202 move during release of the global shutter.

Similarly, in multiple exposure highly-saturated frame 120A shown in FIG. 2, lights 234A, 234B, and 234C of traffic signal 204 deviate from each other little by little, resulting in multiple imaging. This is because movement of the target vehicle causes relative movement of traffic signal 204.

Exposure time and the number of exposures related to image sensor 12 can be changed for each image frame. Further, in image sensor 12, exposure time and the number of exposures can be changed for each of high-sensitivity cell 20 and highly-saturated cell 22.

Determiner section 18 determines whether surroundings of the target vehicle are in a dark place. Determiner section 18 may perform this determination according to a signal from image sensor 12 or a predetermined photosensor. Alternatively, determiner section 18 may perform this determination according to whether it is at nighttime. Alternatively, determiner section 18 may perform this determination in cooperation with the automatic illumination function of the headlights of the target vehicle. Alternatively, determiner section 18 may perform this determination according to whether the target vehicle is running in a tunnel.

Receiver section 14 receives, from image sensor 12, single exposure high-sensitivity frame 100A and multiple exposure highly-saturated frame 120A created at the same time, and transmits them to control section 16.

Control section 16 receives, from receiver section 14, single exposure high-sensitivity frame 100A and multiple exposure highly-saturated frame 120A. As described above, mainly light is captured in multiple exposure highly-saturated frame 120A taken in a dark place. In other words, no other objects are captured in multiple exposure highly-saturated frame 120A. Accordingly, control section 16 can easily specify the motion tracks of the other vehicles in accordance with light from the other vehicles in multiple exposure highly-saturated frame 120A. In other words, control section 16 can specify the motion tracks of the other vehicles in a dark place in relatively short time (or at a relatively light process load). The details will be explained below with reference to FIG. 2.

As shown in FIG. 2, multiple exposure highly-saturated frame 120A contains multiple rays of light 232A, 232B, and 232C. Control section 16 specifies the motion track of the other vehicle 202 emitting that light 232, in accordance with a positional relationship between multiple rays of light 232A, 232B, and 232C contained in multiple exposure highly-saturated frame 120A. Similarly, control section 16 can also specify the motion track of the other vehicle 200 emitting that light 230, in accordance with a positional relationship between multiple rays of light 230A, 230B, and 230C.

Multiple exposure highly-saturated frame 120 contains light 234A, 234B, and 234C from traffic signal 204. However, traffic signal 204 is a static object and the other vehicles 200 and 202 are moving objects. When only the motion tracks of moving objects should be extracted, control section 16 removes the motion tracks of light from static objects, such as traffic signal 204 and street lights (not shown in the drawing), by the optical flow method. For example, control section 16 removes, among the specified motion tracks, the motion track along the same direction as the travel direction of the target vehicle. In the case of FIG. 2, the motion track of light 234 from the traffic signal along the same direction as the travel direction of the target vehicle is removed. Accordingly, control section 16 can extract only the motion tracks of the moving objects.

It should be noted that the position of light in the image frame may be in the central coordinates in the imaging region of the light or in the coordinates with the largest amount of incident light in the imaging region of the light. In addition, the motion track of light may be a vector connecting the coordinates of rays of light. In addition, the motion track of each of the other vehicles may be obtained by correcting the motion track of the light in accordance with a predetermined correction parameter.

Control section 16 can issue at least one of the following control commands (C1) and (C2) (or control signal) 160 to image sensor 12 to control the operation of image sensor 12.

(C1) Control command 160 for instructing, among high-sensitivity cell 20 and highly-saturated cell 22, only highly-saturated cell 22 to generate a multiple exposure frame. Control section 16 issues that control command 160 if determiner section 18 determines that the surroundings of the target vehicle are in a dark place.

(C2) Control command 160 for designating an exposure time each time a multiple exposure frame is created. Control section 16 calculates an exposure time with which an object is recognizably imaged, and issues control command 160.

Figure 3:
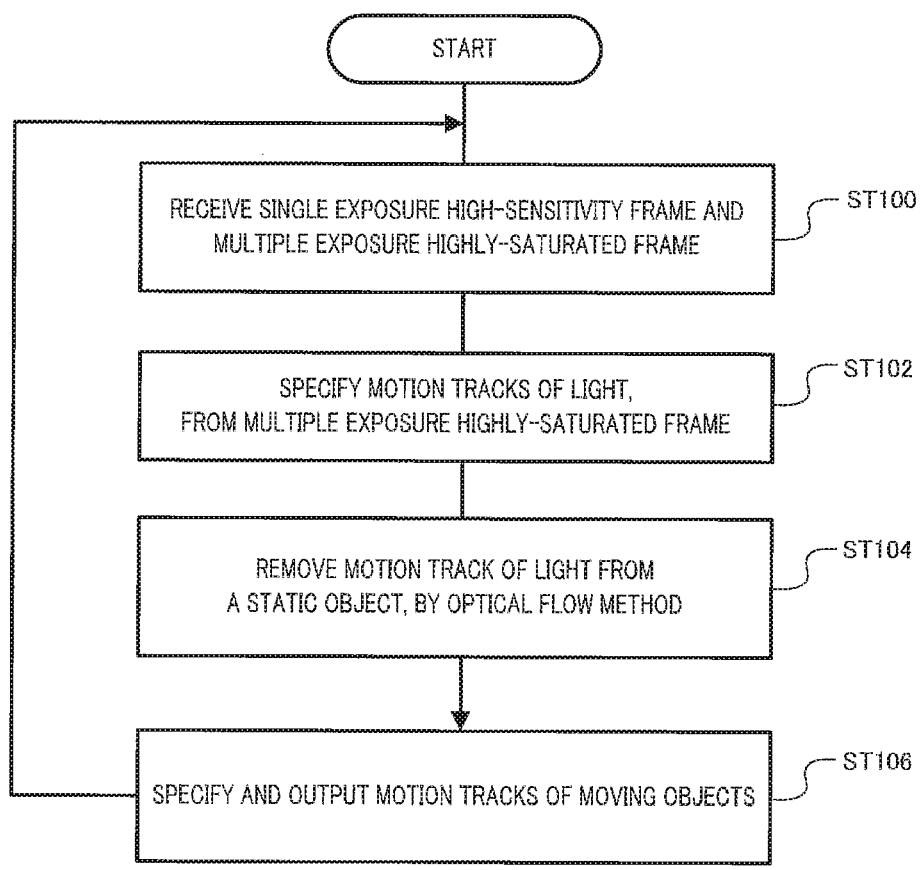
FIG. 3 is a flow chart of processing in control section according to Embodiment 1.

FIG. 3 is a flow chart of processing in control section 16 according to Embodiment 1. Processing in control section 16 will now be explained with reference to FIGS. 2 and 3. It should be noted that the flow chart shows processing performed when determiner section 18 determines that the surroundings of the target vehicle are in a dark place and control section 16 issues, to image sensor 12, control command 160 (i.e., aforementioned control command C1) for instructing only highly-saturated cell 22 to generate a multiple exposure frame.

Control section 16 receives, from receiver section 14, single exposure high-sensitivity frame 100A and multiple exposure highly-saturated frame 120A created at the same time (ST100).

Next, control section 16 specifies e motion tracks of light, from multiple exposure highly-saturated frame 120A (ST102).

Next, control section 16 specifies, by the optical flow method, the motion track of light from a static object (light 234 from the traffic signal) among the motion tracks of light specified in ST102, and removes it (ST104). Accordingly, only the motion tracks of light from the moving objects (light 230 and 232 from the other vehicles) remain.

Next, control section 16 specifies the motion tracks of the moving objects in accordance with the motion tracks of light from the moving objects remaining in ST104. Control section 16 then outputs information 140 related to the specified motion tracks of the moving objects to a predetermined apparatus in the subsequent stage (ST106). The predetermined apparatus in the subsequent stage is, for example, an electronic control section (ECU) mounted on the target vehicle for controlling automated driving or drive assistance.

Control section 16 repeats the aforementioned processing of ST100 to ST106.

It should be noted that control section 16 grants an ID to each moving object specified in ST106 and, upon specification of the same moving object in the second or later repeated processing, the same ID may be granted to the same moving object. Accordingly, the motion of the same moving object can be tracked.

It should be noted that control section 16 may recognize an object by using single exposure high-sensitivity frame 100A received in ST100, and give an output including the recognition results about the object to the predetermined apparatus in the subsequent stage in ST106. Since even an object in a dark place is captured in single exposure high-sensitivity frame 100A, control section 16 can recognize the object.

Control section 16 may recognize an object by using single exposure high-sensitivity frame 100A and multiple exposure highly-saturated frame 120A received in ST100, and give an output including the recognition results about the object to the predetermined apparatus in the subsequent stage in ST106.

Therefore, even if, as shown in FIG. 2, control section 16 cannot recognize the other vehicle 202 present in a blown out highlight caused by light 220 from the other vehicle 200, from only single exposure high-sensitivity frame 100A, it can recognize the other vehicle 202 present in a blown out highlight related to light 230 from the other vehicle 200 from multiple exposure highly-saturated frame 120A.

Embodiment 1 allows the motion track of a moving object to be easily specified even if the surroundings of the target vehicle are in a dark place and objects to be recognized even if the surroundings of the target vehicle are in a dark place.

Embodiment 2

In Embodiment 1, the motion tracks of multiple rays of light in a multiple exposure highly-saturated frame are specified. However, the starting point of a motion track of light cannot be clear only from a multiple exposure highly-saturated frame. In other words, the travel direction of light cannot be clear.

For this reason, in Embodiment 2, highly-saturated cell 22 in image sensor 12 is forced to alternately output a single exposure frame and a multiple exposure frame, thereby specifying the starting point of the motion track of light. It should be noted that the configuration of an imaging apparatus including an image generating apparatus according to Embodiment 2 is similar to that shown in FIG. 1 and its description will therefore be omitted.

Figure 4:
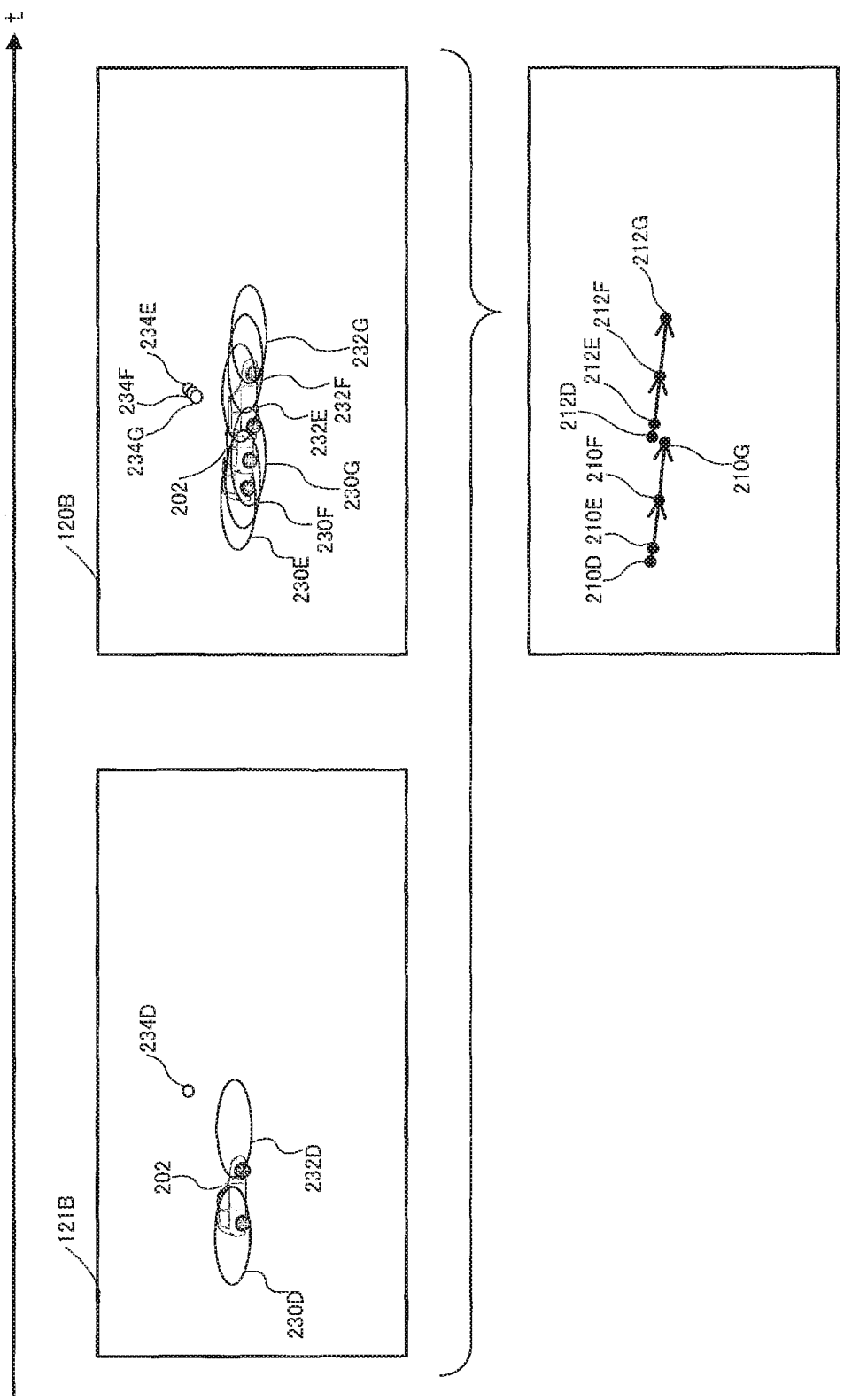
FIG. 4 is a diagram showing image frames output from an image sensor in Embodiment 2.

FIG. 4 is a diagram showing image frames output from highly-saturated cell 22 in image sensor 12 in Embodiment 2.

Single exposure highly-saturated frame 121B shown in FIG. 4 is an image frame created by a single exposure in highly-saturated cell 22 at nighttime. Single exposure highly-saturated frame 121B contains headlight 230D of another vehicle 200 moving from left to right in the drawing, headlight 232D of another vehicle 202 moving in the same way, and light 234D from traffic signal 204.

Multiple exposure highly-saturated frame 120B shown in FIG. 4 is an image frame created by highly-saturated cell 22 at nighttime with three multiple exposures as the next frame of single exposure highly-saturated frame 121B. In multiple exposure highly-saturated frame 120B in FIG. 4, headlights 230E, 230F, and 230G of the other vehicle 200 moving from left to right in the drawing deviate from each other little by little, resulting in multiple imaging. The same applies to headlights 232E, 232F, and 232G of the other vehicle 202. In multiple exposure highly-saturated frame 120B shown in FIG. 4, lights 234E, 234F, and 234G of traffic signal 204 deviate from each other little by little, resulting in multiple imaging.

Control section 16 specifies, using single exposure highly-saturated frame 121B, the starting point of the motion track of light in the next frame, i.e., multiple exposure highly-saturated frame 120B.

For example, control section 16 specifies, among positions 212E, 212F, and 212G of multiple rays of light 232E, 232F, and 232G emitted by the other vehicle 202 contained in multiple exposure highly-saturated frame 120B, position 212E of light 232E which is the closest to position 212D of light 232D emitted by the other vehicle 202 contained in single exposure highly-saturated frame 121B, as the starting point of the motion track of light 232. This is because the time gap between the time when single exposure highly-saturated frame 121B was created and the time when the next frame, i.e., multiple exposure highly-saturated frame 120B was created is relatively short and the travel distance of the other vehicle 202 during the gap is therefore assumed to be relatively short.

Control section 16 can issue the following control command (or control signal) (C3) in addition to the aforementioned (C1) and (C2) to image sensor 12 to control the operation of image sensor 12.

(C3) Control command 160 for instructing, among high-sensitivity cell 20 and highly-saturated cell 22, only highly-saturated cell 22 to alternately generate a single exposure frame and a multiple exposure frame. Control section 16 issues that control command 160 or aforementioned control command 160 (C1) if determiner section 18 determines that the surroundings of the target vehicle are in a dark place.

Figure 5:
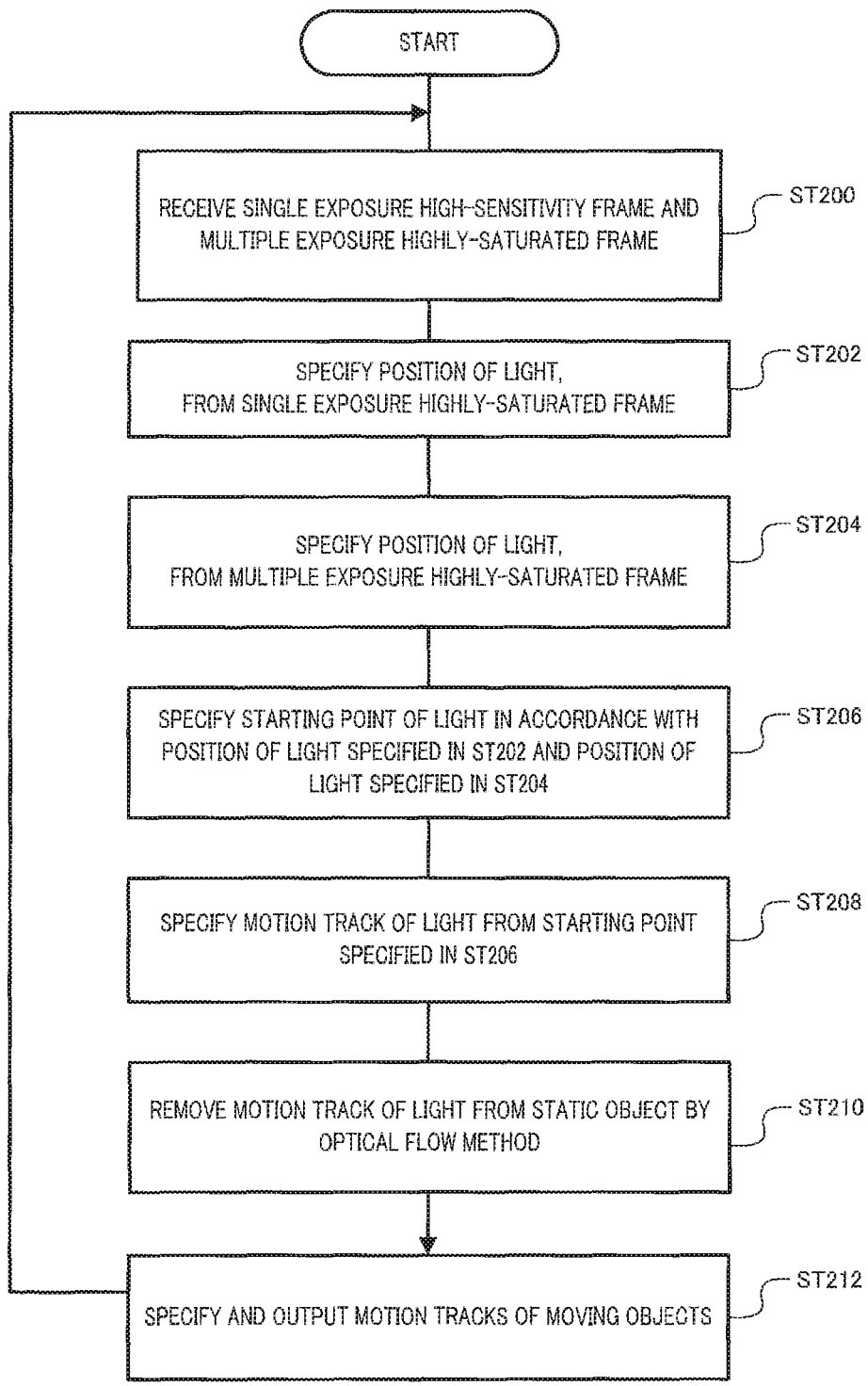
FIG. 5 is a flow chart of processing in control section according to Embodiment 2.

FIG. 5 is a flow chart of processing in control section 16 according to Embodiment 2. Processing in control section 16 will now be explained with reference to FIGS. 4 and 5. It should be noted that the flow chart shows processing performed when determiner section 18 determines that the surroundings of the target vehicle are in a dark place and control section 16 issues, to image sensor 12, control command 160 (i.e., aforementioned control command C3) for instructing only highly-saturated cell 22 to alternately generate a single exposure frame and a multiple exposure frame.

Control section 16 receives, from receiver section 14, single exposure highly-saturated frame 121B and the next frame, i.e., multiple exposure highly-saturated frame 120B (ST200).

Next, control section 16 specifies position 212D of light 232D in single exposure highly-saturated frame 121B (ST202).

Control section 16 then specifies positions 212E, 212F, and 212G of light 232E, 232F, and 232G in multiple exposure highly-saturated frame 120B (ST204).

Control section 16 then specifies, among positions 212E, 212F, and 212G of light 232E, 232F, and 232G specified in ST204, starting point position 212E of the motion track of light 232, by using position 212D of light 232D specified in ST202 (ST206).

Control section 16 then generates the motion track of that light 232 (direction vector following positions 212E, 212F, and 212G in the order presented) in accordance with a positional relationship between starting point position 212E of light 232 specified in ST206 and positions 212E, 212F, and 212G of light 232 specified in ST204 (ST208). It should be noted that control section 16 generates motion tracks in the same manner for light 230 from the other vehicle 200 and light 234 from traffic signal 204.

Control section 16 then removes, among the motion tracks of light generated in ST208, the motion tracks of light from static objects by the optical flow method and extracts the motion tracks of light from moving objects (ST210). In the case of FIG. 4, light 234 from traffic signal 204, which is light from a static object, is removed, and light 230 from the other vehicle 200 and light 234 from the other vehicle 202, which are light from moving objects, are extracted.

Control section 16 then specifies, in accordance with the motion tracks of light from the moving objects extracted in ST210, the motion tracks of these moving objects and outputs information 140 related to the specified motion tracks to the predetermined apparatus in the subsequent stage (ST212).

Control section 16 repeats the aforementioned processing of ST200 to ST212.

It should be noted that highly-saturated cell 22 may repeat processing in which a single exposure frame and then more than one multiple exposure frames are generated. In this case, control section 16 specifies the position of the starting point of light from the single exposure frame and specifies the motion track of that light by using more than one multiple exposure frames. Further, in this case, control section 16 can issue the following control command (or control signal) (C4) in addition to the aforementioned (C1) to (C3).

(C4) Control command 160 is issued for instructing, among high-sensitivity cell 20 and highly-saturated cell 22, only highly-saturated cell 22 to generate a single exposure frame 100 and then N (N is an integer of two or more) multiple exposure highly-saturated frames 120.

Like in Embodiment 1, control section 16 may receive single exposure high-sensitivity frame 100A and recognize an object by using that single exposure high-sensitivity frame 100A in ST200, and give an output including the recognition results about the object to the predetermined apparatus in the subsequent stage in ST212. Since even an object in a dark place is captured in single exposure high-sensitivity frame 100A, control section 16 can recognize the object.

Like in Embodiment 1, control section 16 may receive single exposure high-sensitivity frame 100A and recognize an object by using that single exposure high-sensitivity frame 100A and single exposure highly-saturated frame 121B or multiple exposure highly-saturated frame 120B created at the same time in ST200, and give an output including the recognition results about the object to the predetermined apparatus in the subsequent stage in ST212.

Therefore, even if, as shown in FIG. 4, control section 16 cannot recognize the other vehicle 202 present in a blown out highlight caused by light 220 from the other vehicle 200, from only single exposure high-sensitivity frame 100A, it can recognize the other vehicle 202 present in a blown out highlight related to light 230 from the other vehicle 200 from single exposure highly-saturated frame 121B or multiple exposure highly-saturated frame 120B.

Embodiment 2 allows the motion track and travel direction of a moving object to be easily specified even if the surroundings of the target vehicle are in a dark place. Further, the object can be recognized even if the surroundings of the target vehicle are in a dark place.

The above embodiments may be mere examples for explaining the present disclosure, and the scope of the present disclosure may not be limited to only these embodiments. The present disclosure can be implemented by those skilled in the art in any other ways without departing from the summary of the present disclosure.

INDUSTRIAL APPLICABILITY

An image generating apparatus, an image generating method, a program, and a recording medium related to the present disclosure allow the travel directions of moving objects to be recognized, and are suitable for use in imaging apparatus, car-mounted equipment, and the like.

Reference Signs List

10 Imaging apparatus
11 image generating apparatus
12 Image sensor
14 Receiver section
16 Control section 18 Determiner section
100 Single exposure high-sensitivity frame
120 Multiple exposure highly-saturated frame

The invention claimed is:

1. An image generating apparatus, comprising:
at least one of a processor, a circuit, or a sensor that determines whether surroundings of a target vehicle are in a dark place; and
a control circuit that controls an image sensor including two types of image capturing cells, the two types of image capturing cells including a high-sensitivity cell and a highly-saturated cell, the control circuit being configured to cause the image sensor to create a highly-saturated frame by multiple exposures through the highly-saturated cell, the highly-saturated cell having lower sensitivity and larger charge storage capacity than the high-sensitivity cell, when the surroundings of the target vehicle are in the dark place.

2. The image generating apparatus according to claim 1, wherein
the control circuit specifies a motion track of light emitted by a moving object, in accordance with the highly-saturated frame created by the multiple exposures and received from the image sensor.

3. The image generating apparatus according to claim 2, wherein
the control circuit removes, from among motion tracks of light emitted by the moving object and a static object contained in the highly-saturated frame created by the multiple exposures, a motion track of light emitted by the static object by an optical flow method.

4. The image generating apparatus according to claim 3, wherein
the control circuit identifies the static object and the moving object in accordance with a high-sensitivity frame created by a single exposure and the highly-saturated frame created by the multiple exposures.

5. The image generating apparatus according to claim 1, wherein
the high-sensitivity cell is a first cell and the highly-saturated cell is a second cell, the second cell having a higher saturation than the first cell.

6. The image generating apparatus according to claim 1, wherein
the control circuit is further configured to cause the image sensor to create a high-sensitivity frame by a single exposure through the high-sensitivity cell when the surroundings of the target vehicle are in the dark place.

7. The image generating apparatus according to claim 6, wherein
the control circuit causes the image sensor to create the highly-saturated frame and the high-sensitivity frame at a same time when the surroundings of the target vehicle are in the dark place.

8. The image generating apparatus according to claim 7, wherein
the control circuit is further configured to recognize an object using both the highly-saturated frame and the high-sensitivity frame, created at the same time, and to output a recognition result of the object.

9. An image generating method, comprising:
determining, by at least one of a processor, a circuit, or a sensor, whether surroundings of a target vehicle are in a dark place; and
controlling an image sensor including two types of image capturing cells, the two types of image capturing cells including a high-sensitivity cell and a highly-saturated cell, to cause the image sensor to create a highly-saturated frame by multiple exposures through the highly-saturated cell, the highly-saturated cell having lower sensitivity and larger charge storage capacity than the high-sensitivity cell, when the surroundings of the target vehicle are in the dark place.

10. The image generating method according to claim 9, wherein
the high-sensitivity cell is a first cell and the highly-saturated cell is a second cell, the second cell having a higher saturation than the first cell.

11. A non-transitory recording medium storing a program that, when executed by a computer, causes the computer to perform operations comprising:
determining whether surroundings of a target vehicle are in a dark place; and
controlling an image sensor including two types of image capturing cells, the two types of image capturing cells including a high-sensitivity cell and a highly-saturated cell, to cause the image sensor to create a highly-saturated frame by multiple exposures through the highly-saturated cell, the highly-saturated cell having lower sensitivity and larger charge storage capacity than the high-sensitivity cell, when the surroundings of the target vehicle are in the dark place.

12. The non-transitory recording medium according to claim 11, wherein
the high-sensitivity cell is a first cell and the highly-saturated cell is a second cell, the second cell having a higher saturation than the first cell.

* * * * *